United States Patent [19]
Lunt

[11] Patent Number: 5,803,483
[45] Date of Patent: Sep. 8, 1998

[54] AIRBAG CUSHION AND METHOD OF FOLDING THEREOF

[75] Inventor: Larry F. Lunt, Bringham City, Utah

[73] Assignee: Autoliv ASP, Inc., Ogden, Utah

[21] Appl. No.: 821,131

[22] Filed: Mar. 20, 1997

[51] Int. Cl.$^6$ .................................................. B60R 21/16
[52] U.S. Cl. ................................... 280/728.1; 280/743.1; 53/429; 493/405
[58] Field of Search ............................. 280/743.1, 728.1, 280/731; 53/429, 116, 117, 120; 493/405, 451, 458, 940

[56] References Cited

U.S. PATENT DOCUMENTS

| | | | |
|---|---|---|---|
| 4,004,828 | 1/1977 | Sogabe et al. | 280/743 |
| 4,235,453 | 11/1980 | Lawson et al. | 280/743 |
| 4,351,544 | 9/1982 | Ross | 280/743 |
| 5,022,675 | 6/1991 | Zelenak, Jr. et al. | 280/743 |
| 5,140,799 | 8/1992 | Satoh | 53/429 |
| 5,162,035 | 11/1992 | Baker | 493/405 |
| 5,163,893 | 11/1992 | Hara et al. | 493/458 |
| 5,178,407 | 1/1993 | Kelley | 280/728 |
| 5,240,282 | 8/1993 | Wehner et al. | 280/728 |
| 5,280,952 | 1/1994 | Hirabayashi et al. | 280/739 |
| 5,300,011 | 4/1994 | Budde et al. | 493/405 |
| 5,316,337 | 5/1994 | Yamaji et al | 280/743 R |
| 5,348,341 | 9/1994 | Webber | 280/728 R |
| 5,364,126 | 11/1994 | Kuretake et al. | 280/730 R |
| 5,375,393 | 12/1994 | Baker et al. | 53/429 |
| 5,378,019 | 1/1995 | Smith et al. | 280/743 R |
| 5,382,048 | 1/1995 | Paxton et al. | 280/728 R |
| 5,398,968 | 3/1995 | Emambakhsh et al. | 280/743 R |
| 5,419,579 | 5/1995 | McPherson et al. | 280/743.1 |
| 5,425,551 | 6/1995 | Hawthorn | 280/743.1 |
| 5,425,552 | 6/1995 | Linder | 280/743.1 |
| 5,445,414 | 8/1995 | Pittman et al. | 280/743.1 |
| 5,478,113 | 12/1995 | Rogers | 280/743.1 |
| 5,496,056 | 3/1996 | Dyer | 280/728.1 |
| 5,501,489 | 3/1996 | Folsom et al. | 280/743.1 |
| 5,613,348 | 3/1997 | Lunt et al. | 280/728.1 |

FOREIGN PATENT DOCUMENTS

| | | | |
|---|---|---|---|
| 6-87392 | 3/1994 | Japan | 280/743.1 |
| 2279046 | 12/1994 | United Kingdom . | |

*Primary Examiner*—Peter C. English
*Attorney, Agent, or Firm*—Sally J. Brown

[57] ABSTRACT

An airbag cushion and method of folding thereof are provided which utilize a series of pleated folds which unfold in sequence one after another when an inflating fluid flows into the airbag cushion. In the so folded airbag cushion, a series of folds is made wherein a successive fold is made generally perpendicular to the preceding fold.

15 Claims, 7 Drawing Sheets

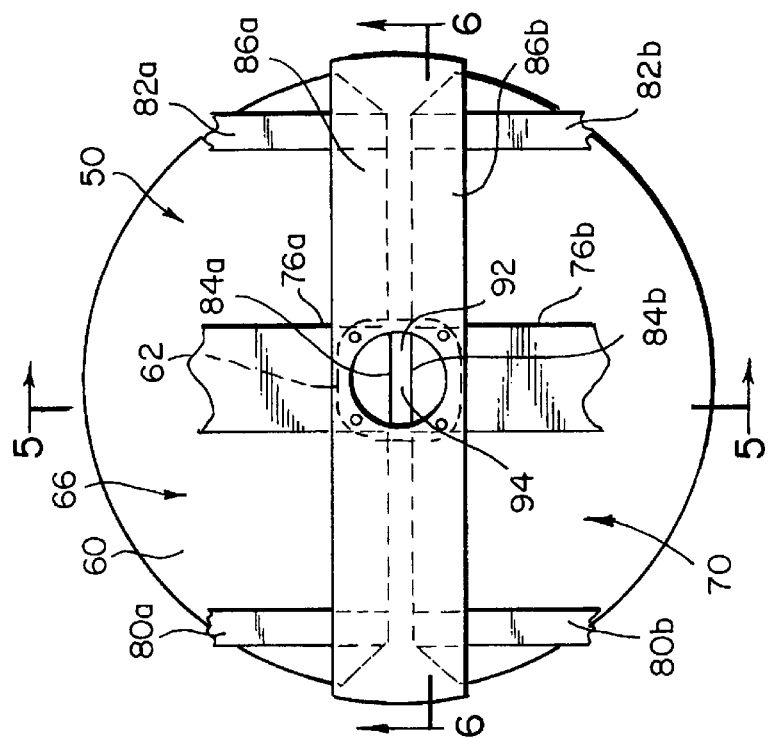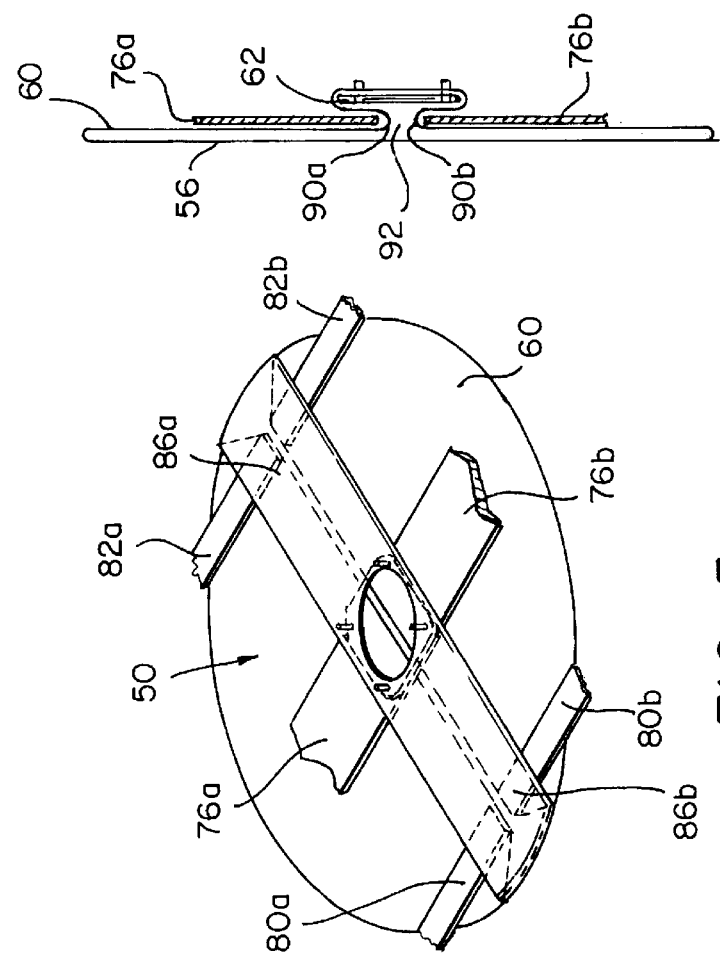

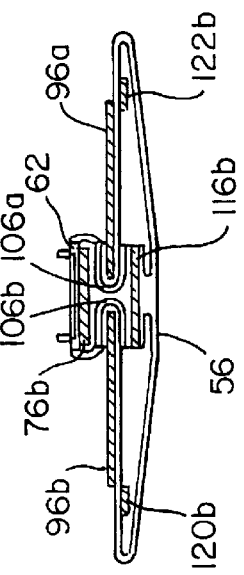
FIG. 14
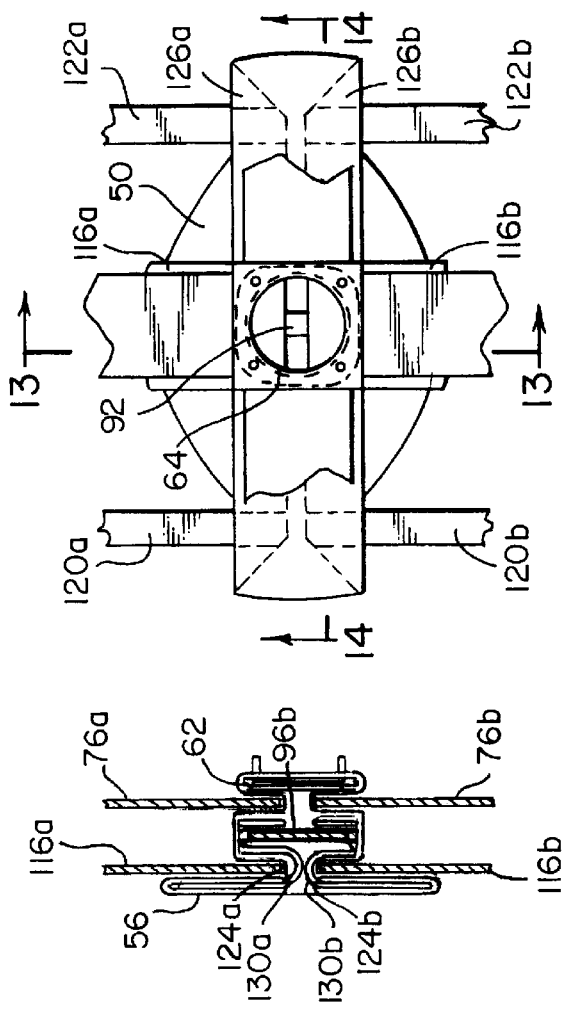
FIG. 12
FIG. 13
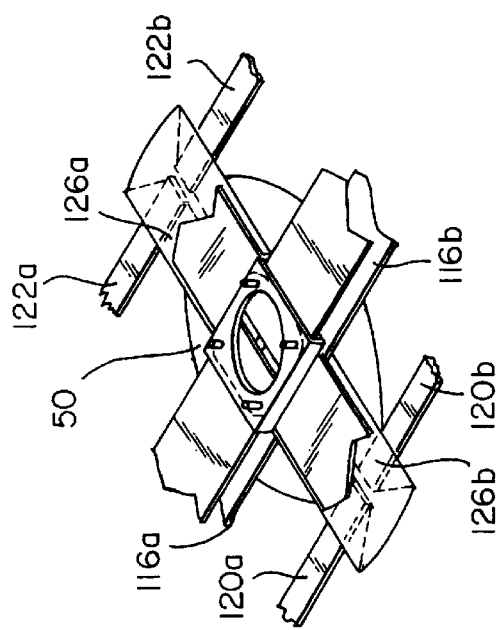
FIG. 11

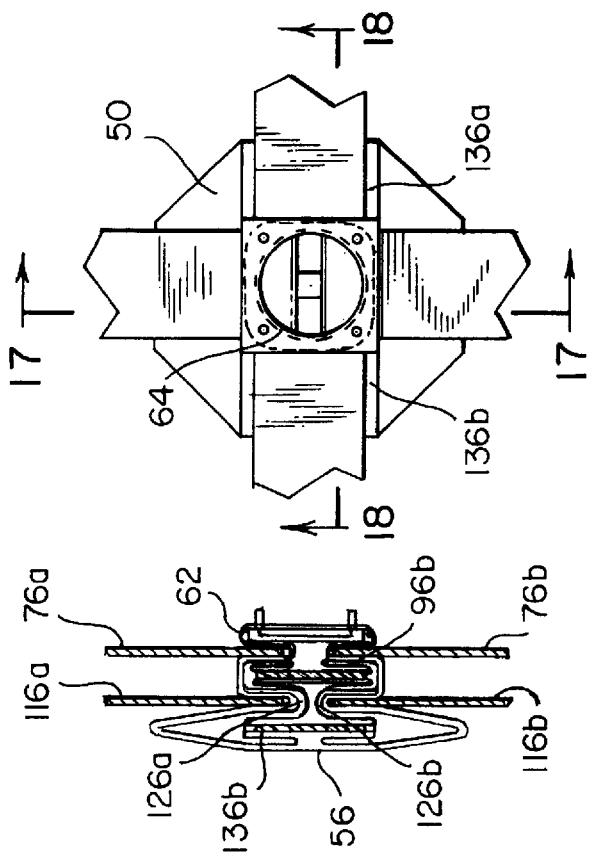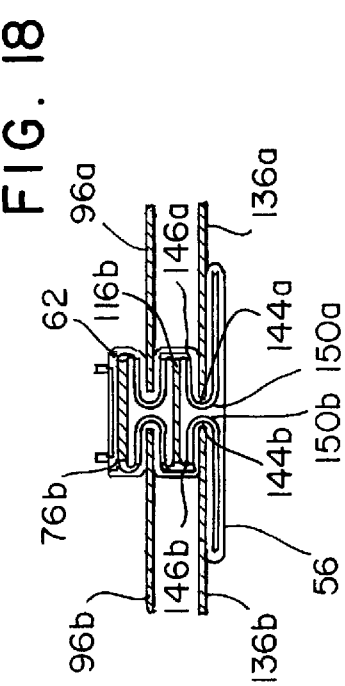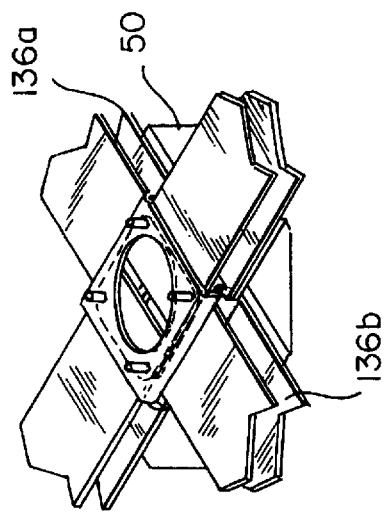

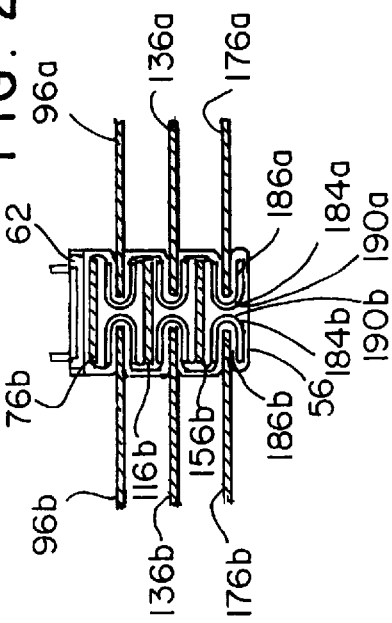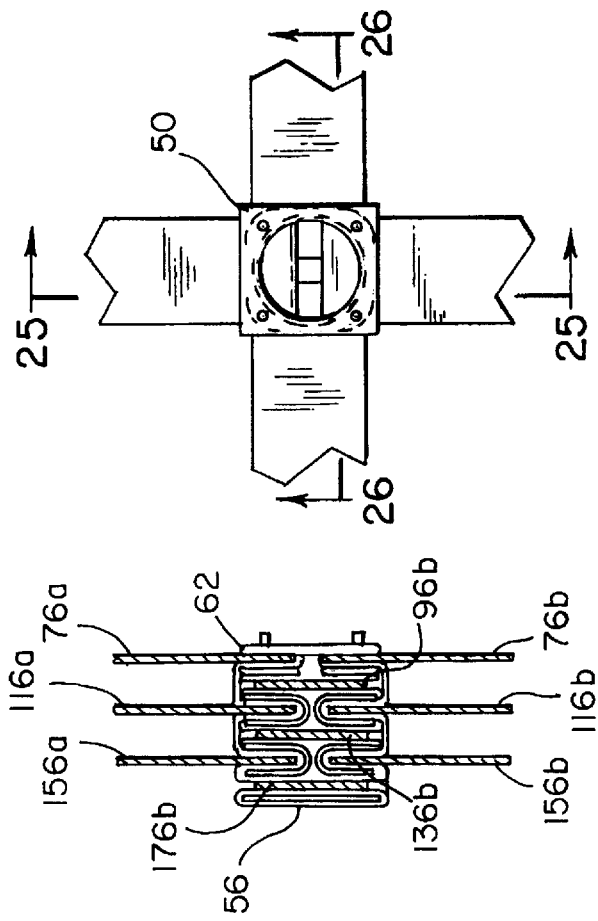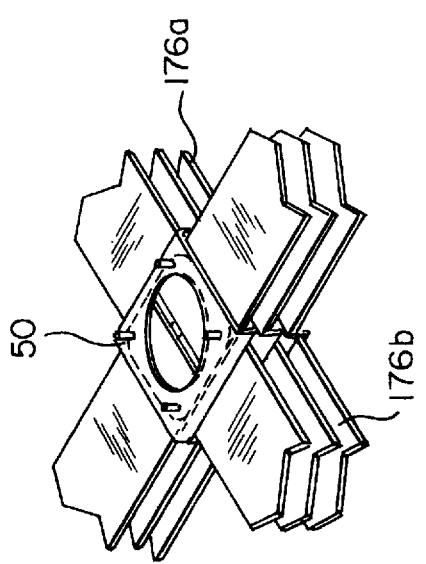

AIRBAG CUSHION AND METHOD OF FOLDING THEREOF

BACKGROUND OF THE INVENTION

This invention relates generally to systems for the passive restraint of vehicle occupants and, more particularly, to an airbag cushion which is inflatable to restrain the movement of a vehicle occupant during a collision and a method of folding such an airbag cushion.

Safety restraint systems which self-actuate from an undeployed to a deployed state without the need for intervention by the operator, i.e., "passive restraint systems," and particularly those restraint systems incorporating inflatable bags or cushions, as well as the use of such systems in motor vehicles have gained general appreciation.

It is well known to protect a vehicle occupant using an airbag cushion that is inflated with a fluid, e.g., an inert gas, when the vehicle encounters sudden deceleration, such as in a collision. In such systems, the airbag cushion is typically housed in an uninflated and folded condition to minimize space requirements. In an emergency situation calling for deployment of the airbag cushion, inflation gas is communicated from an inflator to rapidly inflate and deploy the airbag cushion to contact the vehicle occupant as the occupant moves forward within the vehicle passenger cabin. The airbag cushion softens or at least cushions the motion of the occupant thereby protecting the same from serious injury. In general, such airbag cushions are commonly designed to be inflated in no more than a few milliseconds.

Vehicular inflatable restraint systems generally include multiple crash sensors generally positioned about or mounted to one or more of the frame and body of the subject vehicle and serve to sense sudden decelerations by the vehicle. In turn, the sensor sends a signal to an airbag module or assembly strategically positioned within the riding compartment of the vehicle to actuate deployment of the airbag cushion.

Generally, to be effective it is desirable that an airbag cushion be stored in an out-of-the-way location until needed. Moreover, an airbag cushion is desirably stored in such a manner that it can be rapidly activated to function in the desired manner. In modern vehicle design, however, where space comes at a premium, out-of-the way storage volumes for the storage of an airbag cushion are usually rather limited. Thus, an airbag cushion is typically folded into a small packet so that it fits into a small volume.

Moreover, the manner in which an airbag cushion has been folded affects the deployment characteristics of the airbag cushion when activated. For example, to minimize the possibility of harm to a vehicle occupant, it has generally been preferred that an airbag cushion deploy rather quickly and evenly in a spread out (side-to-side) manner rather than inflating first toward one side then the other or inflating directly toward the occupant and then filling in from side-to-side. Further, some fold patterns can result in the airbag cushion, when initially activated, extending an undesirable distance toward the vehicle occupant, resulting in undesired contact between the occupant and the deploying airbag cushion.

Typical conventional processes for folding vehicular airbag cushions place heavy reliance on manual labor. Such conventional folding suffers from a number of problems. For example, in view of the large number of airbag cushions now being used in vehicles, the manual folding of airbag cushions can necessitate a tremendous amount of labor and expense. Moreover, the various manual motions required in typical airbag cushion folding regimes, when repeated for a large number of airbag cushions, can have various undesired effects. Further, repetitive motions can lead to boredom, which in turn can lead to poor work product and job performance.

Another problem relates to the consistency with which the airbag cushions are folded using such a conventional folding process. Specifically, while some airbag cushions may be folded acceptably, others can tend to be folded using a less than optimal folding pattern or in a manner which results in an overly large airbag cushion storage package. The lack of consistency can also result in a considerable amount of reworking of folding of airbag cushions being required, an undesired added expense, as well as inconsistent airbag cushion deployment patterns, which may pose unnecessary dangers to a vehicle occupant.

SUMMARY OF THE INVENTION

A general object of the invention is to provide an improved fold arrangement for an airbag cushion.

A more specific objective of the invention is to overcome one or more of the problems described above.

The general object of the invention can be attained, at least in part, through an inflatable folded airbag cushion folded using a series of pleated folds which unfold in sequence one after another when an inflating fluid flows into the airbag cushion. The airbag cushion has a mouth defined by a cushion retainer and includes a front panel and a back panel. The airbag cushion has an initially unfolded and uninflated condition. When in the initially unfolded and uninflated condition, the airbag cushion is positioned with the back panel facing up and the mouth at a central position on the back panel. The back panel has an upper portion above the mouth, a lower portion below the mouth, a first portion to the left of the mouth and a second portion to the right of the mouth.

Folding of the airbag cushion is effected by a series of pleated folds, one after the other, including:

the centers of the airbag cushion back panel upper and lower portions, respectively, being tucked toward the mouth of the airbag cushion, between the cushion retainer and the front panel, to form a first pair of upper and lower portion longitudinal pleats, respectively, the centers of the airbag cushion back panel first and second portions, respectively, being tucked toward the mouth of the airbag cushion, between the first pair of upper and lower portion longitudinal pleats and the front panel, to form a first pair of first and second portion lateral pleats, respectively, the centers of the unfolded cushion back panel upper and lower portions, respectively, being tucked toward the mouth of the airbag cushion, between the first pair of first and second portion lateral pleats and the front panel, to form a second pair of upper and lower portion longitudinal pleats, respectively, and the centers of the unfolded cushion back panel first and second portions, respectively, being tucked toward the mouth of the airbag cushion, between the second pair of upper and lower portion longitudinal pleats and the front panel, to form a second pair of first and second portion lateral pleats, respectively.

The prior art fails to provide an airbag cushion fold that results in a folded airbag cushion of as small as desired volume, advantageously impacts the deployment characteristics of the airbag cushion when activated to an extent as great as desired, provides proper protection to an occupant regardless of steering wheel orientation and produces substantially equal deployment forces on the airbag cushion, the associated module hardware and the steering wheel assembly to which it has been joined.

The invention further comprehends an inflatable folded airbag cushion for restraining a vehicle occupant. The airbag cushion is folded using a series of pleated folds which unfold in sequence one after another when an inflating fluid flows into the airbag cushion. The airbag cushion is made of an airbag material and has a mouth defined by a cushion retainer. The airbag cushion includes a front panel and a back panel and has an initially unfolded and uninflated condition.

The airbag cushion, when in the initially unfolded and uninflated condition, is positioned with the back panel facing up and the mouth at a central position on the back panel. The back panel includes an upper portion above the mouth, a lower portion below the mouth, a first portion to the left of the mouth and a second portion to the right of the mouth.

Folding of the airbag cushion is effected by a series of pleated folds, one after the other, including:

the centers of the airbag cushion back panel upper and lower portions, respectively, being tucked toward the mouth of the airbag cushion, between the cushion retainer and the front panel, to form a first pair of upper and lower portion longitudinal pleats, respectively, the centers of the airbag cushion back panel first and second portions, respectively, being tucked toward the mouth of the airbag cushion, between the first pair of upper and lower portion longitudinal pleats and the front panel, to form a first pair of first and second portion lateral pleats, respectively, the centers of the unfolded cushion back panel upper and lower portions, respectively, being tucked toward the mouth of the airbag cushion, between the first pair of first and second portion lateral pleats and the front panel, to form a second pair of upper and lower portion longitudinal pleats, respectively, and the centers of the unfolded cushion back panel first and second portions, respectively, being tucked toward the mouth of the airbag cushion, between the second pair of upper and lower portion longitudinal pleats and the front panel, to form a second pair of first and second portion lateral pleats, respectively, wherein each of the upper and lower portion longitudinal pleats of the first and second pairs of longitudinal pleats and each of the first and second portion lateral pleats of the first and second lateral pleats includes a pleat edge.

The pleat edges are spaced apart to form a direct flow passageway whereby, when an inflating fluid flows into the airbag cushion, the inflation fluid can directly contact the center region of the inner surface of the front panel.

The invention still further comprehends a method of folding an inflatable airbag cushion. The airbag cushion includes a mouth defined by a cushion retainer, a front panel, a back panel and initially unfolded and uninflated with the back panel facing up and the mouth at a central position on the back panel. The back panel has an upper portion above the mouth, a lower portion below the mouth, a first portion to the left of the mouth and a second portion to the right of the mouth. The method includes the steps of:

tucking the centers of the airbag cushion back panel upper and lower portions, respectively, toward the mouth of the airbag cushion, between the cushion retainer and the front panel, to form a first pair of upper and lower portion longitudinal pleats, respectively, tucking the centers of the airbag cushion back panel first and second portions, respectively, toward the mouth of the airbag cushion, between the first pair of upper and lower portion longitudinal pleats and the front panel, to form a first pair of first and second portion lateral pleats, respectively, tucking the centers of the unfolded cushion back panel upper and lower portions, respectively, toward the mouth of the airbag cushion, between the first pair of first and second portion lateral pleats and the front panel, to form a second pair of upper and lower portion longitudinal pleats, respectively, and tucking the centers of the unfolded cushion back panel first and second portions, respectively, toward the mouth of the airbag cushion, between the second pair of upper and lower portion longitudinal pleats and the front panel, to form a second pair of first and second portion lateral pleats, respectively.

Other objects and advantages will be apparent to those skilled in the art from the following detailed description taken in conjunction with the appended claims and drawings.

BRIEF DESCRIPTION OF THE DRAWINGS

FIG. 3 is an isometric view of the airbag cushion of FIG. 1 being partially folded using a cushion folding apparatus, fragmentarily shown, to form a first pair of upper and lower portion longitudinal pleats.

FIG. 4 is a top view of the folding of the airbag cushion shown in FIG. 3.

FIG. 5 is a sectional view, taken substantially along the line 5—5, of FIG. 4.

FIG. 6 is a sectional view, taken substantially along the line 6—6, of FIG. 4.

FIG. 11 is an isometric view of the airbag cushion of FIG. 7 being further partially folded to form a second pair of upper and lower portion longitudinal pleats.

FIG. 12 is a top view of the folding of the airbag cushion shown in FIG. 11.

FIG. 13 is a sectional view, taken substantially along the line 13—13, of FIG. 12.

FIG. 14 is a sectional view, taken substantially along the line 14—14, of FIG. 12.

FIG. 15 is an isometric view of the airbag cushion of FIG. 11 being further partially folded to form a second pair of first and second portion lateral pleats.

FIG. 16 is a top view of the folding of the airbag cushion shown in FIG. 15.

FIG. 17 is a sectional view, taken substantially along the line 17—17, of FIG. 16.

FIG. 18 is a sectional view, taken substantially along the line 18—18, of FIG. 16.

FIG. 23 is an isometric view of the airbag cushion of FIG. 19 being further partially folded to form a third pair of first and second portion lateral pleats.

FIG. 24 is a top view of the folding of the airbag cushion shown in FIG. 23.

FIG. 25 is a sectional view, taken substantially along the line 25—25, of FIG. 24.

FIG. 26 is a sectional view, taken substantially along the line 26—26, of FIG. 24.

DETAILED DESCRIPTION OF THE INVENTION

The airbag cushion of the invention is specially folded and adapted to be inflated within a vehicle to cushion or restrain an occupant of a vehicle, in the event of an emergency situation, such as a collision.

While the invention is described hereinafter with particular reference to a driver side airbag cushion for automotive vehicles including, for example, vans, pickup trucks, and particularly automobiles, it is to be understood that the invention also has applicability not only with other types or kinds of airbag module assemblies for automotive vehicles including passenger side assemblies, but also with other types of vehicles including, for example, airplanes. With respect to automotive vehicles it will also be appreciated that due to usual physical differences between passenger and driver side airbag module assemblies, including the typical difference in the size and shape of the airbag cushion, the invention is perceived to have particular initial utility relative to driver side airbag cushions.

Figure 2:
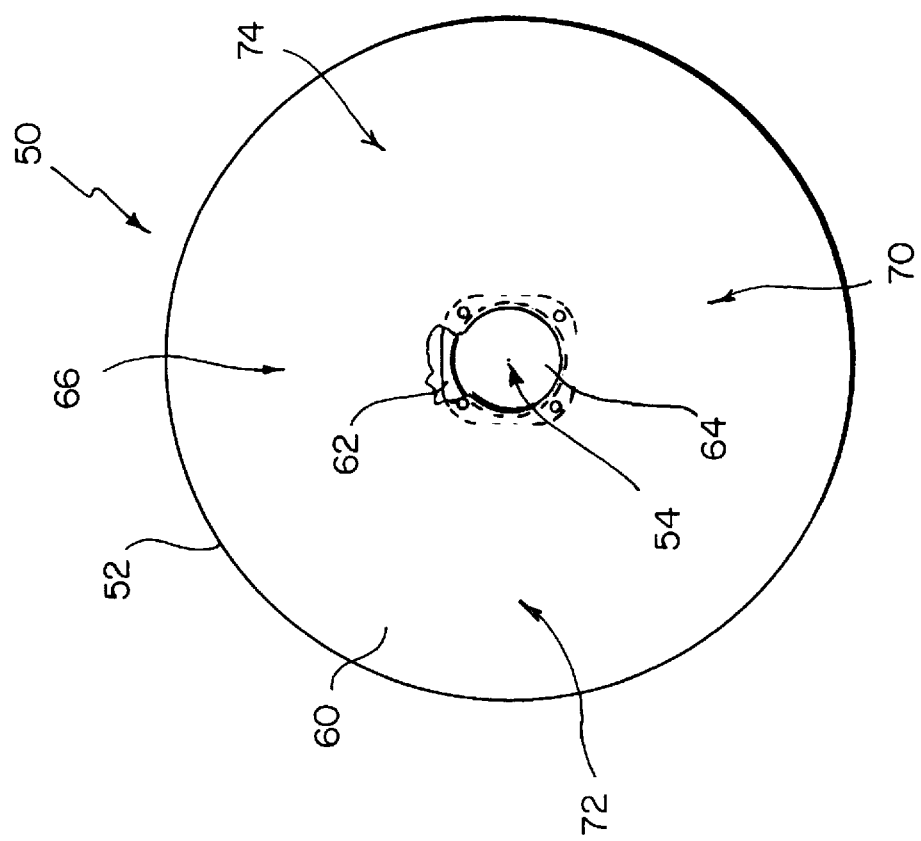
FIG. 2 is a top view of the airbag cushion of FIG. 1 in partial cut-away.
Figure 1:
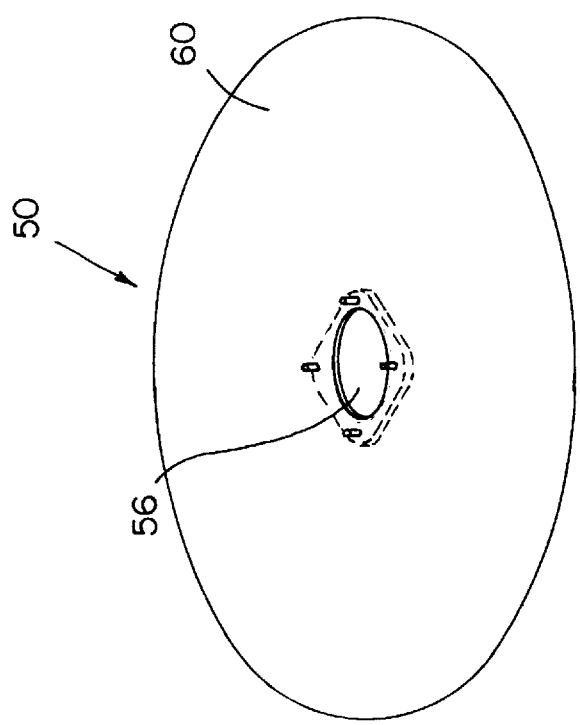
FIG. 1 is an isometric view of an airbag cushion lying flat in an initially unfolded and uninflated condition.
Figure 8:
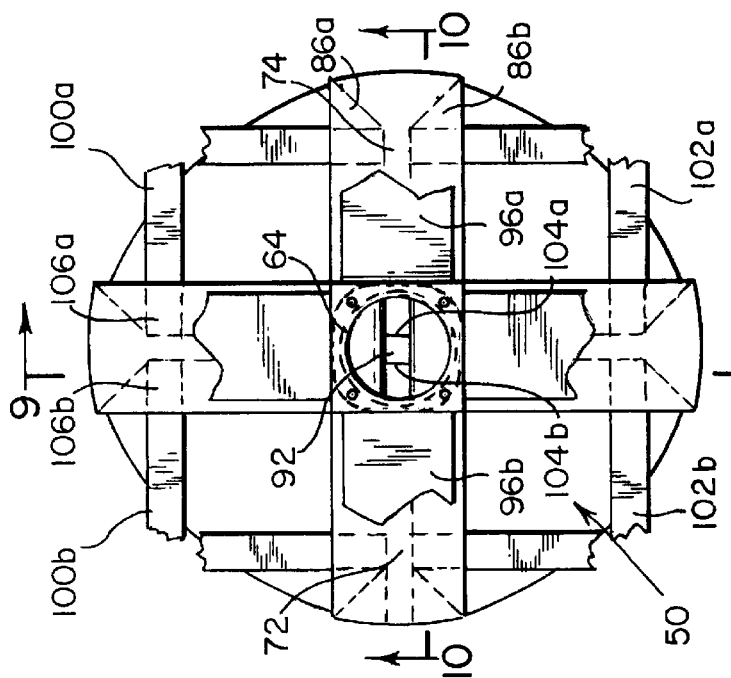
FIG. 8 is a top view of the folding of the airbag cushion shown in FIG. 7.
Figure 10:
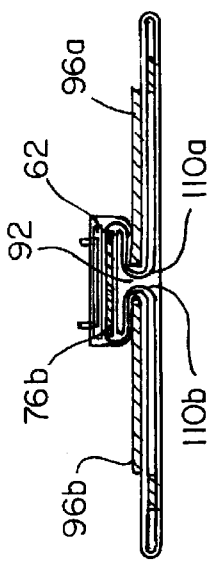
FIG. 10 is a sectional view, taken substantially along the line 10—10, of FIG. 8.
Figure 9:
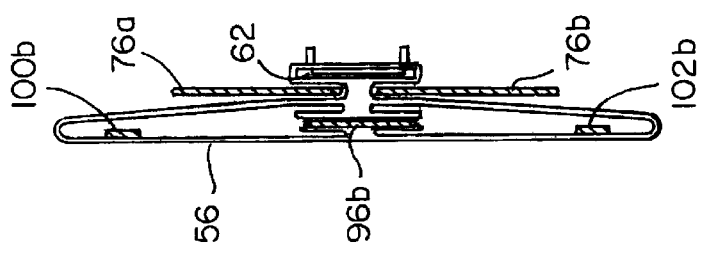
FIG. 9 is a sectional view, taken substantially along the line 9—9, of FIG. 8.
Figure 7:
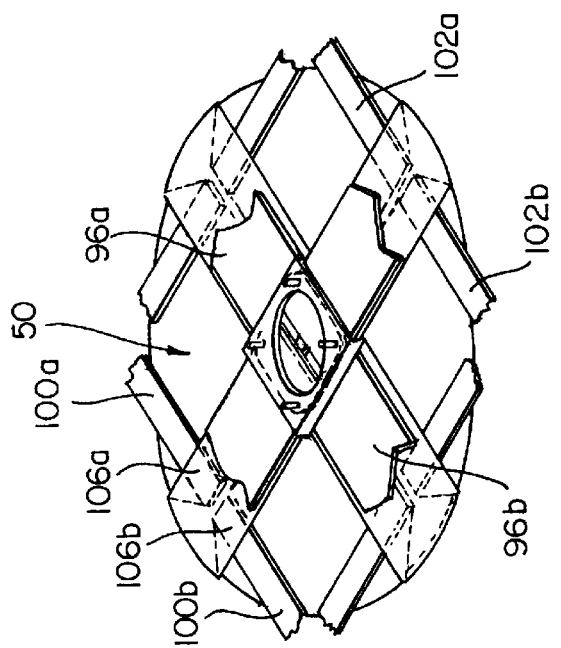
FIG. 7 is an isometric view of the airbag cushion of FIG. 3 being further partially folded to form a first pair of first and second portion lateral pleats.
Figure 20:
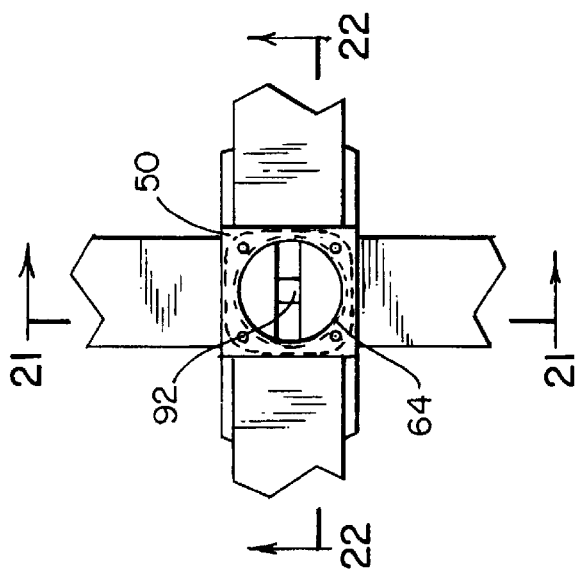
FIG. 20 is a top view of the folding of the airbag cushion shown in FIG. 19.
Figure 22:
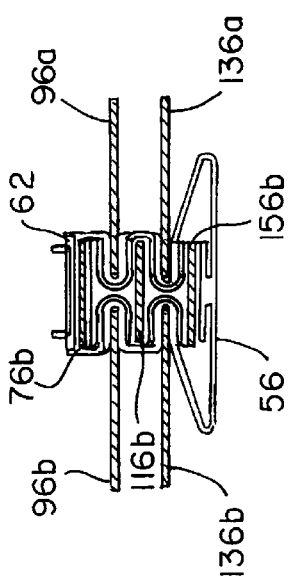
FIG. 22 is a sectional view, taken substantially along the line 22—22, of FIG. 20.
Figure 21:
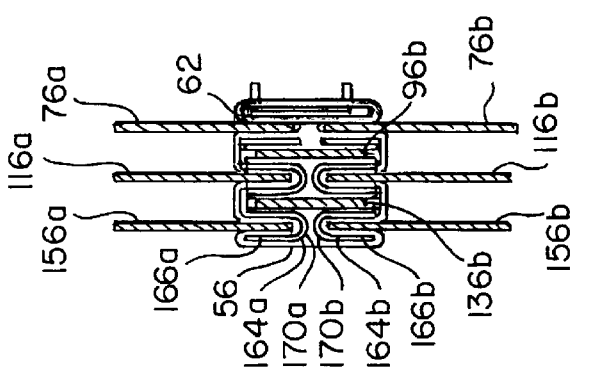
FIG. 21 is a sectional view, taken substantially along the line 21—21, of FIG. 20.
Figure 19:
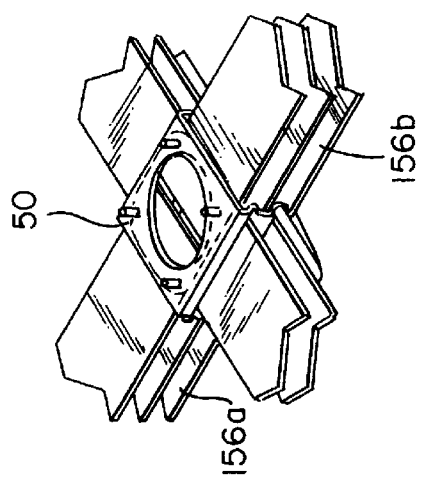
FIG. 19 is an isometric view of the airbag cushion of FIG. 15 being further partially folded to form a third pair of first and second portion lateral pleats.

Referring to FIGS. 1 and 2, there is shown an airbag cushion, generally designated by the reference numeral 50, lying flat in an initially unfolded and uninflated condition. As identified above, the airbag cushion 50 is a driver side airbag cushion such as designed to be mounted to or in the steering wheel assembly of the automotive vehicle, not shown.

The airbag cushion 50 can be formed of various airbag materials such as known in the art, such as a woven material or fabric, such as nylon, for example. In one preferred form and as shown, the airbag cushion 50 has a substantially uniform and symmetric shape with a substantially circular outer circumference 52 and an approximate center 54 when in a deflated, flattened, unfolded condition.

The airbag cushion 50 includes a front panel 56 and a back panel 60. In one preferred form and as shown, the front and back panels, 56 and 60, respectively, are of similar shape and size. It is to be appreciated, however, that such panels even though of similar shape and size may, if desired, be of either or both different fabrication and construction. For example, the front panel may, if desired and as known, be fabricated to reduce or minimize permeability therethrough. More specifically, for example, such front panel may, if desired, be fabricated of a substantially gas impermeable material such as a fabric that is substantially gas impermeable or a fabric that is treated or coated, such as is known in the art, so as to be rendered substantially gas impermeable.

As shown, the airbag cushion 50 also includes a retainer 62 in the form of a generally square-shaped ring. The retainer 62 defines the inflating gas inlet opening or mouth 64 of the airbag cushion 50 and is useful in connecting the cushion 50 to a corresponding part of the vehicle, e.g., such as the vehicle steering wheel assembly in the case of the illustrated driver side airbag cushion, such as in a manner well known in the art.

The airbag cushion mouth 64 is located at a central position on the back panel 60. The back panel 60 includes an upper portion 66, a lower portion 70, a first portion 72 and a second portion 74, at or located above, below, to the left and to the right, respectively, of the airbag cushion mouth 64.

The airbag cushion fold in accordance with the invention is sometimes referred to as a "N-fold" as it is effected by a series of pleated folds, one after the other, illustrated in FIGS. 3 through 18 of the drawings and comprises steps 1 through 4, as described hereinafter, wherein each successive fold is made generally perpendicular to the preceding fold.

Step 1: As shown in FIGS. 3–6, lay the cushion 50 so that the airbag cushion back panel 60 faces up. By means of a first set of opposed longitudinal folding blades 76a and 76b and a first set of two pairs of opposed longitudinal holding blades 80(a–b) and 82(a–b), respectively, the centers 84a and 84b of the airbag cushion back panel upper and lower portions 66 and 70, respectively, are tucked toward the airbag cushion mouth 64, between the cushion retainer 62 and the airbag cushion front panel 56, to form a first pair of upper and lower portion longitudinal pleats, 86a and 86b, respectively.

Each of the first pair of upper and lower portion longitudinal pleats, 86a and 86b, respectively, includes a pleat edge 90a and 90b, respectively. The pleat edges 90a and 90b are spaced apart to form a direct flow passageway 92 at the airbag cushion mouth 64 whereby, when an inflating fluid flows into the airbag cushion 50, the inflation fluid can directly contact the front panel 56 at a center region 94 of the front panel 56 at the inner surface thereof.

Step 2: As shown in FIGS. 7–10, by means of a first set of opposed lateral folding blades 96a and 96b and a first set of two pairs of opposed lateral holding blades 100(a–b) and 102(a–b), respectively, the centers 104a and 104b of the airbag cushion back panel first and second portions, 72 and 74, respectively, are tucked toward the airbag cushion mouth 64, between the first pair of upper and lower portion longitudinal pleats, 86a and 86b, respectively, and the airbag cushion front panel 56, to form a first pair of first and second portion lateral pleats, 106a and 106b, respectively.

Each of the first pair of first and second portion lateral pleats, 106a and 106b, respectively, includes a pleat edge 110a and 110b, respectively. The pleat edges 110a and 110b, similar to the pleat edges 90a and 90b, are spaced apart to further form the direct flow passageway 92 at the airbag cushion mouth 64.

Step 3: As shown in FIGS. 11–14, by means of a second set of opposed longitudinal folding blades 116a and 116b and a second set of two pairs of opposed longitudinal holding blades 120(a–b) and 122(a–b), respectively, the centers 124a and 124b, respectively, of the unfolded cushion back panel upper and lower portions are tucked toward the airbag cushion mouth 64, between the first pair of first and second portion lateral pleats 106a and 106b, respectively, and the front panel 56, to form a second pair of upper and lower portion longitudinal pleats, 126a and 126b, respectively.

Similar to the pleats described above, each of the second pair of upper and lower portion longitudinal pleats, 126a and 126b, respectively, includes a pleat edge 130a and 130b, respectively. The pleat edges 130a and 130b are spaced apart to still further form the direct flow passageway 92.

Step 4: As shown in FIGS. 15–18, by means of a second set of opposed lateral folding blades 136a and 136b, respectively, the centers 144a and 144b of the unfolded cushion back panel first and second portions are tucked toward the airbag cushion mouth 64, between the second pair of upper and lower portion longitudinal pleats 126a and 126b, respectively, and the front panel 56, to form a second pair of first and second portion lateral pleats, 146a and 146b, respectively.

It will be appreciated that the airbag cushion 50 has been sufficiently compacted by the preceding folding steps such that holding blades, such as used in prior steps, are no longer required to maintain the partially folded airbag cushion in proper alignment. Thus, in any following steps subsequent folding is effected without the use of such holding blades.

Again, similar to the pleats described above, each of the second pair of first and second portion lateral pleats, 146a and 146b, respectively, includes a pleat edge, 150a and 150b, respectively. The pleat edges 150a and 150b are, similar to those previously described and in accordance with one preferred embodiment, spaced apart to further form the direct flow passageway 92.

It will be appreciated that by so folding the airbag cushion, the folds are made and positioned generally uniformly between the front panel (e.g., the retainer ring enclosing portion thereof) and the back panel portions of the cushion. The folded airbag cushion of the invention thus will generally unfold forward (toward an oppositely seated occupant) and radially, to the sides, in all directions substantially simultaneously. Thus, in the case of a driver side airbag cushion mounted in or adjacent the steering wheel assembly, such a folded airbag cushion is better able to afford protection to such an occupant regardless of the position or orientation of the steering wheel.

Further, upon deployment, an airbag cushion folded as described herein deploys such that the front panel remains in the forefront, with the balance of the airbag cushion filling behind the front panel. As a result, sweeping motions by the deploying airbag cushion are avoided, thereby minimizing the possibility of the occupant suffering abrasions due to the airbag cushion moving in a sweeping fashion to arrive into the final desired position.

Still further, it will be appreciated that the substantially uniform and simultaneous unfolding of an airbag cushion folded as described above, facilitates the loading and placement of such a folded airbag cushion and associated airbag module within a vehicle, e.g., to or in the steering column or assembly, as the loads resulting from such a folded airbag cushion are substantially uniformly distributed.

Moreover, the folding of an airbag cushion in a manner, as described above, is conducive to automation and thus many of the problems discussed above relative to those conventional folding processes which place a heavy reliance on manual labor can be minimize or avoided.

As those skilled in the art will appreciate, one or more of the foregoing steps can, if desired, be repeated. Thus, in accordance with one specific embodiment of the invention, the airbag cushion fold is further effected by the additional pleated folds comprising step 5, as described hereinafter.

Step 5: As shown in FIGS. 19–22, by means of a third set of opposed longitudinal folding blades 156a and 156b, respectively, the centers 164a and 164b of the unfolded airbag cushion back panel upper and lower portions are tucked toward the airbag cushion mouth 64, between the second pair of first and second lateral portion vertical pleats 146a and 146b, respectively, and the airbag cushion front panel 56, to form a third pair of upper and lower portion longitudinal pleats, 166a and 166b, respectively.

As will be appreciated, each of the third pair of upper and lower portion longitudinal pleats, 166a and 166b, respectively, includes a pleat edge, 170a and 170b, respectively, spaced apart to further form the direct flow passageway 92.

The so folded airbag cushion can be further folded by the additional pleated folds comprising step 6, as described hereinafter.

Step 6: As shown in FIGS. 23–26, by means of a third set of opposed lateral folding blades 176a and 176b, respectively, the centers 184a and 184b of the unfolded airbag cushion back panel first and second portions are tucked toward the airbag cushion mouth 64, between the third pair of upper and lower portion longitudinal pleats 166a and 166b, respectively, and the front panel 56, to form a third pair of first and second portion lateral pleats, 186a and 186b, respectively.

As will be appreciated, each of the third pair of first and second portion lateral pleats, 186a and 186b, respectively, includes a pleat edge, 190a and 190b, respectively, spaced apart to further form the direct flow passageway 92.

Thus, it is to be appreciated that the airbag cushion fold of the invention can result in the airbag cushion being folded in a desirably small volume; provide proper protection to an occupant regardless of steering wheel orientation; produce substantially equal deployment forces on the airbag cushion, the associated module hardware and the steering wheel assembly to which it has been joined; and deploy in a desirable manner.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An inflatable folded airbag cushion folded using a series of pleated folds which unfold in sequence one after another when an inflating fluid flows into said airbag cushion, said airbag cushion having a mouth defined by a cushion retainer, a front panel, a back panel and an initially unfolded and uninflated condition, said airbag cushion when in said initially unfolded and uninflated condition being positioned with the back panel facing up and the mouth at a central position on the back panel, with the back panel having an upper portion above the mouth, a lower portion below the mouth, a first portion to the left of the mouth and a second portion to the right of the mouth, folding of said airbag cushion being effected by a series of pleated folds, one after the other, comprising:

the centers of the airbag cushion back panel upper and lower portions, respectively, being tucked toward the mouth of said airbag cushion, between the cushion retainer and the front panel, to form a first pair of upper and lower portion longitudinal pleats, respectively, the centers of the airbag cushion back panel first and second portions, respectively, being tucked toward the mouth of said airbag cushion, between the first pair of upper and lower portion longitudinal pleats and the front panel, to form a first pair of first and second portion lateral pleats, respectively, the centers of the unfolded cushion back panel upper and lower portions, respectively, being tucked toward the mouth of said airbag cushion, between the first pair of first and second portion lateral pleats and the front panel, to form a second pair of upper and lower portion longitudinal pleats, respectively, and the centers of the unfolded cushion back panel first and second portions, respectively, being tucked toward the mouth of said airbag cushion, between the second pair of upper and lower portion longitudinal pleats and the front panel, to form a second pair of first and second portion lateral pleats, respectively.

2. The inflatable folded airbag cushion of claim 1 wherein each of the upper and lower portion longitudinal pleats of said first and second pairs of longitudinal pleats and each of the first and second portion lateral pleats of said first and second pairs of lateral pleats includes a pleat edge and said pleat edges are spaced apart to form a direct flow passageway whereby, when an inflating fluid flows into said airbag cushion, the inflation fluid can directly contact the center region of the inner surface of the front panel.

3. The inflatable folded airbag cushion of claim 1 wherein, after the formation of said second pair of first and second portion lateral pleats, the folding of said airbag cushion is further effected by additional pleated folds comprising:

the centers of the unfolded airbag cushion back panel upper and lower portions, respectively, being tucked toward the mouth of said airbag cushion, between said second pair of first and second portion lateral pleats and the airbag cushion front panel, to form a third pair of upper and lower portion longitudinal pleats, respectively.

4. The inflatable folded airbag cushion of claim 3 wherein, after the formation of said third pair of upper and lower portion longitudinal pleats, the folding of said airbag cushion is further effected by additional pleated folds comprising:

the centers of the unfolded airbag cushion back panel first and second portions, respectively, being tucked toward the mouth of said airbag cushion, between the third pair of upper and lower portion longitudinal pleats and the front panel, to form a third pair of first and second portion lateral pleats, respectively.

5. The inflatable folded airbag cushion of claim 1 wherein said airbag cushion, when in said initially unfolded and uninflated condition and laid flat, has a circular outer circumference.

6. The inflatable folded airbag cushion of claim 1 wherein the pleated folds are made and positioned uniformly between the front panel and the back panel portions of said airbag cushion.

7. An inflatable folded airbag cushion for restraining a vehicle occupant, said airbag cushion being folded using a series of pleated folds which unfold in sequence one after another when an inflating fluid flows into said airbag cushion, said airbag cushion being made of an airbag material and having a mouth defined by a cushion retainer, said airbag cushion having a front panel and a back panel and an initially unfolded and uninflated condition, said airbag cushion when in said initially unfolded and uninflated condition being positioned with the back panel facing up and the mouth at a central position on the back panel, with the back panel having an upper portion above the mouth, and a lower portion below the mouth, a first portion to the left of the mouth and a second portion to the right of the mouth, folding of said airbag cushion being effected by a series of pleated folds, one after the other, comprising:

the centers of the airbag cushion back panel upper and lower portions, respectively, being tucked toward the mouth of said airbag cushion, between the cushion retainer and the front panel, to form a first pair of upper and lower portion longitudinal pleats, respectively, the centers of the airbag cushion back panel first and second portions, respectively, being tucked toward the mouth of said airbag cushion, between the first pair of upper and lower portion longitudinal pleats and the front panel, to form a first pair of first and second portion lateral pleats, respectively, the centers of the unfolded cushion back panel upper and lower portions, respectively, being tucked toward the mouth of said airbag cushion, between the first pair of first and second portion lateral pleats and the front panel, to form a second pair of upper and lower portion longitudinal pleats, respectively, and the centers of the unfolded cushion back panel first and second portions, respectively, being tucked toward the mouth of said airbag cushion, between the second pair of upper and lower portion longitudinal pleats and the front panel, to form a second pair of first and second portion lateral pleats, respectively, wherein each of the upper and lower portion longitudinal pleats of said first and second pairs of longitudinal pleats and each of the first and second portion lateral pleats of said first and second pairs of lateral pleats includes a pleat edge and said pleat edges are spaced apart to form a direct flow passageway whereby, when an inflating fluid flows into said airbag cushion, the inflation fluid can directly contact the center region of the inner surface of the front panel.

8. The inflatable folded airbag cushion of claim 7 wherein, after the formation of said second pair of first and second portion lateral pleats, the folding of said airbag cushion is further effected by additional pleated folds comprising:

the centers of the unfolded airbag cushion back panel upper and lower portions, respectively, being tucked toward the mouth of said airbag cushion, between said second pair of first and second portion lateral pleats and the airbag cushion front panel, to form a third pair of upper and lower portion longitudinal pleats, respectively, wherein each of the upper and lower portion longitudinal pleats of said third pair of longitudinal pleats also includes a pleat edge, said pleat edges of said third pair of longitudinal pleats also being spaced apart and also serving to form said direct flow passageway.

9. The inflatable folded airbag cushion of claim 8 wherein, after the formation of said third pair of upper and lower portion longitudinal pleats, the folding of said airbag cushion is further effected by additional pleated folds comprising:

the centers of the unfolded airbag cushion back panel first and second portions, respectively, being tucked toward the mouth of said airbag cushion, between the third pair of upper and lower portion longitudinal pleats and the front panel, to form a third pair of first and second portion lateral pleats, respectively, and wherein each of the first and second portion lateral pleats of said third pair of lateral pleats includes a pleat edge, said pleat edges of said third pair of lateral pleats also being spaced apart and also serving to form said direct flow passageway.

10. The inflatable folded airbag cushion of claim 7 wherein said airbag cushion, when in said initially unfolded and uninflated condition and laid flat, has a circular outer circumference.

11. The inflatable folded airbag cushion of claim 7 wherein the pleated folds are made and positioned uniformly between the front panel and the back panel portions of said airbag cushion.

12. A method of folding an inflatable airbag cushion having a mouth defined by a cushion retainer, the airbag cushion also having a front panel, a back panel and initially unfolded and uninflated with the back panel facing up and the mouth at a central position on the back panel, with the back panel having an upper portion above the mouth, a lower portion below the mouth, a first portion to the left of the mouth and a second portion to the right of the mouth, said method comprising the steps of:

tucking the centers of the airbag cushion back panel upper and lower portions, respectively, toward the mouth of the airbag cushion, between the cushion retainer and the front panel, to form a first pair of upper and lower portion longitudinal pleats, respectively, tucking the centers of the airbag cushion back panel first and second portions, respectively, toward the mouth of the airbag cushion, between the first pair of upper and lower portion longitudinal pleats and the front panel, to form a first pair of first and second portion lateral pleats, respectively, tucking the centers of the unfolded cushion back panel upper and lower portions, respectively, toward the mouth of the airbag cushion, between the first pair of first and second portion lateral pleats and the front panel, to form a second pair of upper and lower portion longitudinal pleats, respectively, and tucking the centers of the unfolded cushion back panel first and second portions, respectively, toward the mouth of the airbag cushion, between the second pair of upper and lower portion longitudinal pleats and the front panel, to form a second pair of first and second portion lateral pleats, respectively.

13. The method as defined by claim 12 wherein each of the upper and lower portion longitudinal pleats of said first and second pairs of longitudinal pleats and each of the first and second portion lateral pleats of said first and second pairs of lateral pleats includes a pleat edge and wherein the pleat edges are spaced apart to form a direct flow passageway whereby, when an inflating fluid flows into said airbag cushion, the inflation fluid directly contacts the center region of the inner surface of the front panel.

14. The method as defined by claim 12, wherein after the formation of the second pair of first and second portion lateral pleats, said method additionally comprises the step of:

tucking the centers of the unfolded airbag cushion back panel upper and lower portions, respectively, toward the mouth of the airbag cushion, between the second pair of first and second portion lateral pleats and the airbag cushion front panel, to form a third pair of upper and lower portion longitudinal pleats, respectively.

15. The method as defined by claim 14, wherein after the formation of the third pair of upper and lower portion longitudinal pleats, said method additionally comprises the step of:

tucking the centers of the unfolded airbag cushion back panel first and second portions, respectively, toward the mouth of the airbag cushion, between the third pair of upper and lower portion longitudinal pleats and the front panel, to form a third pair of first and second portion lateral pleats, respectively.

* * * * *